US009927280B2

United States Patent
Alvarado

(10) Patent No.: US 9,927,280 B2
(45) Date of Patent: Mar. 27, 2018

(54) FLUID GAUGE WITH LOW LEVEL DETECTION

(71) Applicant: TITAN LOGIX CORP, Edmonton (CA)

(72) Inventor: Gabriel Jarillo Alvarado, Edmonton (CA)

(73) Assignee: TITAN LOGIX CORP., Edmonton (CA)

( * ) Notice: Subject to any disclaimer, the term of this patent is extended or adjusted under 35 U.S.C. 154(b) by 131 days.

(21) Appl. No.: 14/902,829

(22) PCT Filed: Jul. 4, 2014

(86) PCT No.: PCT/CA2014/000557
§ 371 (c)(1),
(2) Date: Jan. 4, 2016

(87) PCT Pub. No.: WO2015/000068
PCT Pub. Date: Jan. 8, 2015

(65) Prior Publication Data
US 2016/0187180 A1    Jun. 30, 2016

Related U.S. Application Data

(60) Provisional application No. 61/843,018, filed on Jul. 4, 2013.

(51) Int. Cl.
G01F 23/284    (2006.01)

(52) U.S. Cl.
CPC .................. *G01F 23/284* (2013.01)

(58) Field of Classification Search
CPC .................................................... G01F 23/284
(Continued)

(56) References Cited

U.S. PATENT DOCUMENTS 7,355,548 B2    4/2008 Larsson et al.
8,794,063 B2 *  8/2014 Miskell ................. G01F 23/284
                                                 73/290 V
(Continued)

FOREIGN PATENT DOCUMENTS

WO          2011/113142 A1     9/2011
WO      WO 2011/113142 A1      9/2011
WO         WO2011113142 A1 *   9/2011

OTHER PUBLICATIONS

WIPO; International Preliminary Report on Patentability and Written Opinion dated Jan. 14, 2016, issued in corresponding International Application No. PCT/CA2014/000557; 6 pages.
(Continued)

*Primary Examiner* — Hezron E Williams
*Assistant Examiner* — Marrit Eyassu
(74) *Attorney, Agent, or Firm* — Norton Rose Fulbright Canada LLP; Christopher N. Hunter

(57) ABSTRACT

Systems, methods and computer readable media are provided for measuring fluid level in a tank. A system may include: a transmitter gauge installed on or in the tank, the transmitter gauge comprising a probe arranged to be at least partially immersed in the fluid and adapted to conduct energy pulses generated by an energy source within the transmitter gauge; a refractometer module operatively coupled to the transmitter gauge, the refractometer module comprising a processor configured to measure travel times of the energy pulses conducted along the probe and to determine the fluid level in the tank based on the measured travel times: if the fluid level in the tank is below a threshold level, according to a first mode of operation, by determining the fluid level in the tank based on the measured travel time of an energy pulse reflected from a terminal end of the probe,
(Continued)

a length of the probe, a speed of the reflected energy pulse in air, and a speed of the reflected energy pulse in the liquid.

18 Claims, 5 Drawing Sheets

(58) Field of Classification Search
USPC .................................................. 73/290 V
See application file for complete search history.

(56) References Cited

U.S. PATENT DOCUMENTS

| | | | |
|---|---|---|---|
| 2001/0050629 A1* | 12/2001 | Benway | G01F 23/284 342/124 |
| 2008/0302439 A1* | 12/2008 | Spanke | G01F 23/28 141/1 |
| 2013/0174637 A1* | 7/2013 | Yamada | G01F 23/2962 73/1.73 |
| 2014/0196536 A1* | 7/2014 | Murphy | G01F 23/296 73/290 V |

OTHER PUBLICATIONS

International Bureau of WIPO, International Search Report and Written Opinion of the International Searching Authority dated Oct. 14, 2014, issued in respect of International Application No. PCT/CA2014/000557.

* cited by examiner

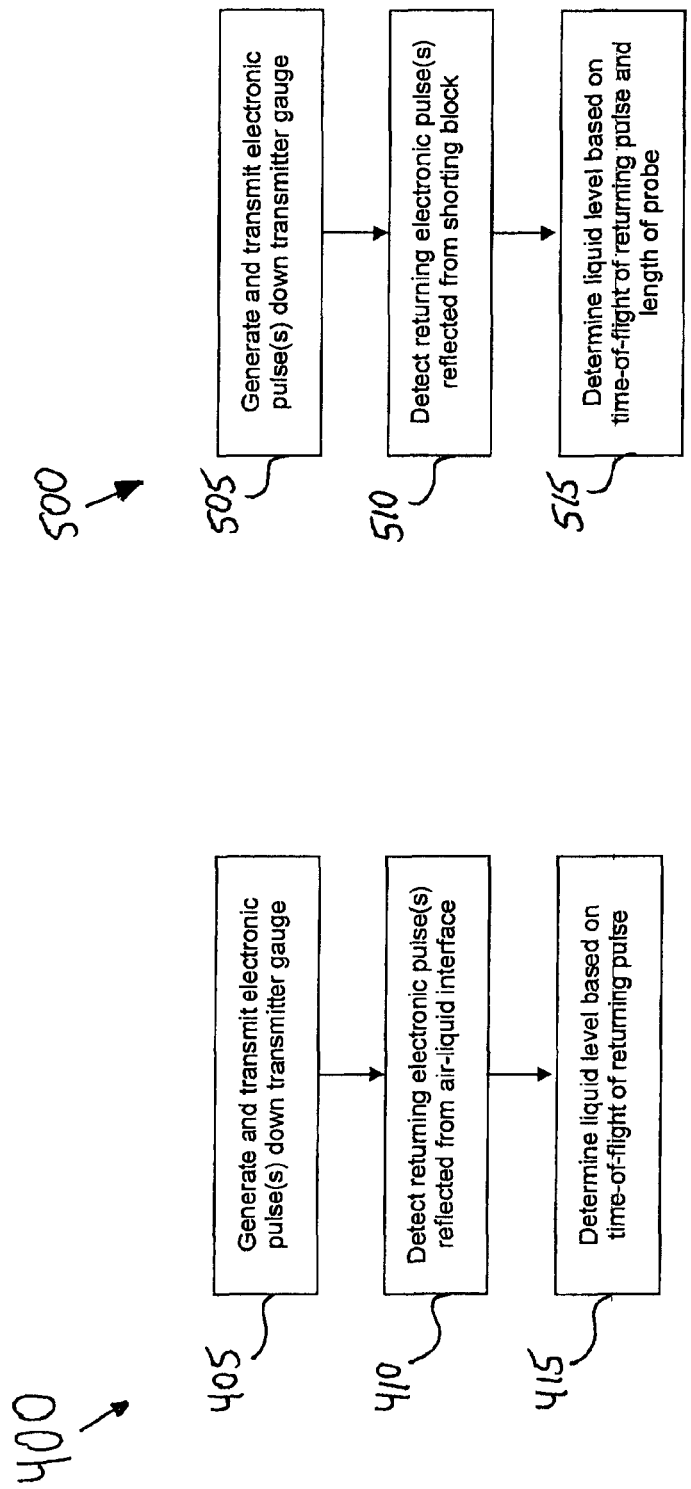

FLUID GAUGE WITH LOW LEVEL DETECTION

TECHNICAL FIELD

The disclosure relates generally to fluid gauges for determining liquid level in a tank and, more particularly, to fluid gauges capable of operation in a dual mode for estimating both high and low liquid levels.

BACKGROUND

Certain transport vehicles, such as trucks, trailers, rail cars, marine tankers, and aircraft in a variety of different businesses or industrial applications are often used to transport expensive and/or hazardous liquids. High-quality, liquid level measurement systems may be usefully deployed in such business and industrial applications in order to monitor the level of the liquids being transported. Mechanical level gauges have been employed in the past to measure liquid level so as to safeguard against overflow. However, such mechanical level gauges have been prone to failure and suffer from measurement inaccuracy.

Fluid management systems based around micropower, guided wave radar and/or time domain telemetry of electronic signals have been developed as an alternative to mechanical levels gauges. Being configured to operate with no moving parts, such electronic fluid gauges may be particularly well suited to use on transport vehicles, such as but not limited to mobile tankers, which may result in generally safer and more cost effective handling and transportation of expensive and/or hazardous liquids. However, electronic fluid gauges may also introduce measurement inaccuracies in certain contexts and/or exhibit other drawbacks or disadvantages.

SUMMARY

The disclosure relates generally to fluid gauges for determining liquid level in a tank and, more particularly, to fluid gauges capable of operation in a dual mode for estimating both high and low liquid levels.

In some embodiments, a system is provided for measuring fluid level in a tank, comprising:
a transmitter gauge installed on or in the tank, the transmitter gauge comprising a probe arranged to be at least partially immersed in the fluid and adapted to conduct energy pulses generated by an energy source within the transmitter gauge;
a refractometer module operatively coupled to the transmitter gauge, the refractometer module comprising a processor configured to measure travel times of the energy pulses conducted along the probe and to determine the fluid level in the tank based on the measured travel times:
if the fluid level in the tank is below a threshold level, according to a first mode of operation, by determining the fluid level in the tank based on the measured travel time of an energy pulse reflected from a terminal end of the probe, a length of the probe, a speed of the reflected energy pulse in air, and a speed of the reflected energy pulse in the liquid.

In some embodiments, a system is provided wherein the processor of the refractometer module is further configured to determine the fluid level in the tank based on the measured travel times: if the fluid level in the tank is above the threshold level, according to a second mode of operation, by determining the fluid level in the tank based on the measured travel time of an energy pulse reflected from an air-liquid interface defined between the air and the liquid in the tank, and a speed of the reflected energy pulse in the air.

In some embodiments, a system is provided wherein the processor of the refractometer module is configured to operate initially according to the second mode of operation.

In some embodiments, a system is provided wherein the processor of the refractometer is configured when in the second mode of operation to:
monitor the fluid level in the tank;
compare the monitored fluid level in the tank with the threshold level; and
if it is determined that the fluid level in the tank has dropped below the threshold level, switch over to the first mode of operation.

In some embodiments, a system is provided wherein the processor of the refractometer module is configured when in the first mode of operation to:
monitor the fluid level in the tank;
compare the monitored fluid level in the tank with the threshold level; and
if it is determined that the fluid level in the tank has risen above the threshold level, switch over to the second mode of operation.

In some embodiments, a system is provided wherein the processor of the refractometer module is configured to determine the threshold level based on a minimum time separation between the measured times-of-flight of the reflected energy pulse from the air-liquid interface and the reflected energy pulse from the terminal end of the probe.

In some embodiments, a system is provided further comprising:
a display unit communicatively linked to at least one of the transmitter gauge and the refractometer module by a communication network, the display unit configured to:
receive fluid level information from the transmitter gauge or the refractometer module representing the determined fluid level in the tank;
calculate a volume of fluid housed in the tank based on the received fluid level information; and
display the calculated volume of fluid housed in the tank.

In some embodiments, a method of measuring fluid level in a tank is provided comprising:
conducting energy pulses along a probe of a transmitter gauge arranged to be at least partially immersed in the fluid;
measuring travel times of the energy pulses conducted along the probe;
determining the fluid level in the tank based on the measured travel times:
if the fluid level in the tank is below a threshold level, according to a first mode of operation, by determining the fluid level in the tank based on the measured travel time of an energy pulse reflected from a terminal end of the probe, a length of the probe, a speed of the reflected energy pulse in air, and a speed of the reflected energy pulse in the liquid.

In some embodiments, a method is provided further comprising determining the fluid level in the tank based on the measured travel times: if the fluid level in the tank is above the threshold level, in a second mode of operation, by determining the fluid level in the tank based on the measured travel time of an energy pulse reflected from an air-liquid interface defined between the air and the liquid in the tank, and a speed of the reflected energy pulse in the air.

In some embodiments, a method is provided further comprising determining the fluid level in the tank initially according to the second mode of operation.

In some embodiments, a method is provided further comprising, when in the second mode of operation:
monitoring the fluid level in the tank;
comparing the monitored fluid level in the tank with the threshold level; and
if it is determined that the fluid level in the tank has dropped below the threshold level, switching over to the first mode of operation.

In some embodiments, a method is provided further comprising, when in the first mode of operation:
monitoring the fluid level in the tank;
comparing the monitored fluid level in the tank with the threshold level; and
if it is determined that the fluid level in the tank has risen above the threshold level, switch over to the second mode of operation.

In some embodiments, a method is provided further comprising determining the threshold level based on a minimum time separation between the measured times-of-flight of the reflected energy pulse from the air-liquid interface and the reflected energy pulse from the terminal end of the probe.

In some embodiments, a method is provided further comprising:
transmitting fluid level information representing the determined fluid level of the tank to a display unit;
at the display unit, calculating a volume of fluid housed in the tank based on the transmitted fluid level information; and
displaying the calculated volume information on the display unit.

In some embodiments, a computer readable medium is provided, the computer readable medium persistently storing instructions that, when executed, program a processor to perform a method of measuring fluid level in a tank, the instructions comprising:
conducting energy pulses along a probe of a transmitter gauge arranged to be at least partially immersed in the fluid;
measuring travel times of the energy pulses conducted along the probe;
determining the fluid level in the tank based on the measured travel times:
if the fluid level in the tank is below a threshold level, according to a first mode of operation, by determining the fluid level in the tank based on the measured travel time of an energy pulse reflected from a terminal end of the probe, a length of the probe, a speed of the reflected energy pulse in air, and a speed of the reflected energy pulse in the liquid.

In some embodiments, a computer readable medium is provided, wherein the instructions further comprise determining the fluid level in the tank based on the measured travel times:
if the fluid level in the tank is above the threshold level, in a second mode of operation, by determining the fluid level in the tank based on the measured travel time of an energy pulse reflected from an air-liquid interface defined between the air and the liquid in the tank, and a speed of the reflected energy pulse in the air.

In some embodiments, a computer readable medium is provided wherein the instructions further comprise determining the fluid level in the tank initially according to the second mode of operation.

In some embodiments, a computer readable medium is provided wherein the instructions further comprise, when in the second mode of operation:
monitoring the fluid level in the tank;
comparing the monitored fluid level in the tank with the threshold level; and
if it is determined that the fluid level in the tank has dropped below the threshold level, switching over to the first mode of operation.

In some embodiments, a computer readable medium is provided wherein the instructions further comprise, when in the first mode of operation:
monitoring the fluid level in the tank;
comparing the monitored fluid level in the tank with the threshold level; and
if it is determined that the fluid level in the tank has risen above the threshold level, switch over to the second mode of operation.

In some embodiments, a computer readable medium is provided wherein the instructions further comprise determining the threshold level based on a minimum time separation between the measured times-of-flight of the reflected energy pulse from the air-liquid interface and the reflected energy pulse from the terminal end of the probe.

In some embodiments, a computer readable medium is provided wherein the instructions further comprise:
transmitting fluid level information representing the determined fluid level of the tank to a display unit;
at the display unit, calculating a volume of fluid housed in the tank based on the transmitted fluid level information; and
displaying the calculated volume information on the display unit.

In various further aspects, the disclosure provides corresponding systems and devices, and logic structures such as machine-executable coded instruction sets for implementing such systems, devices, and methods.

In at least one other broad aspect, the disclosure provides a computer readable medium persistently storing instructions that, when executed, program a processor to perform a method of measuring fluid level in a tank.

Such system(s) and method(s) may advantageously estimate fluid level for both high and low fluid levels, if possible, using a high accuracy approach that is available only for relatively high fluid levels.

Further details of these and other aspects of the described embodiments will be apparent from the detailed description below.

BRIEF DESCRIPTION OF THE DRAWINGS

Reference is now made to the accompanying drawings, in which:

FIG. 4 illustrates a method of determining fluid level in a high fluid level mode of operation according to the disclosure;

FIG. 5 illustrates a method of determining fluid level in a low fluid level mode of operation according to the disclosure.

DETAILED DESCRIPTION OF EMBODIMENTS

Figure 1:
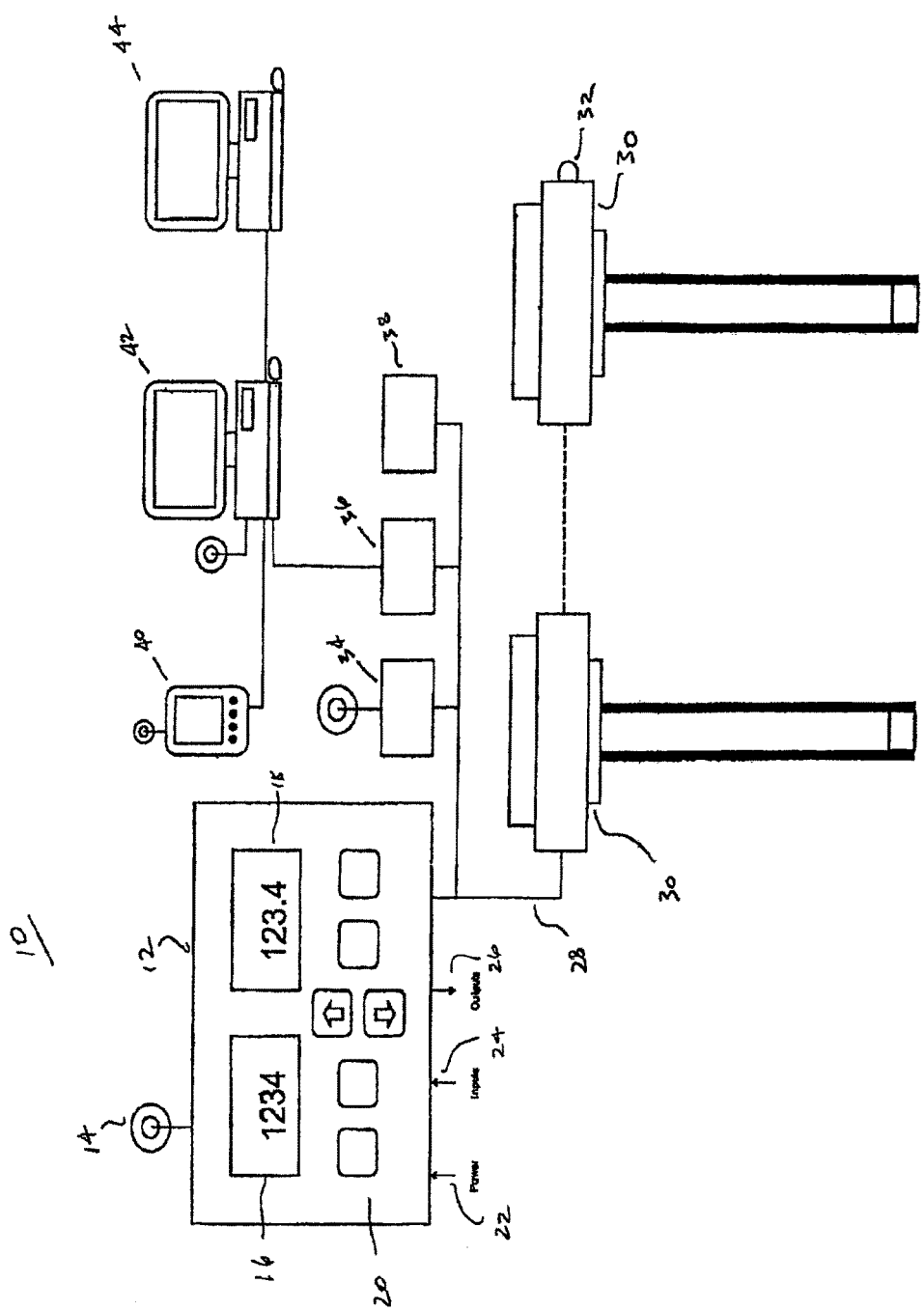
FIG. 1. illustrates a system for measuring fluid level according to the disclosure.

Reference is initially made to FIG. 1, which illustrates an example configuration of a system 10 for measuring fluid level according to the disclosure. As shown, system 10 may include at least one transmitter gauge 30 that is operable, for example, with use of guided wave radar ("GWR") or the like to measure fluid level of fluid housed within a tank. As described further below, the GWR based measurement of fluid level may involve a time-of-flight measurement(s) or one or more electronic pulses transmitted down and reflected back up transmitter gauge 30. Fluid level information measured by the transmitter gauge 30 may be transmitted to display unit 12, or to some other intermediate or other processing device, via a suitable communication channel 28, which may be any wired or wireless communication channel such as a controller area network ("CAN") bus.

Display unit 12 may be any suitable configured device that is operative, in conjunction with hardware and/or driver circuitry, to display one or more different types of fluid level information. Thus, in some embodiments, display unity 12 may comprise multiple separate or otherwise distinct displays, such as a tank display 16 and/or a batch display 18. Display unit 12 may further comprise panel controls 20 for operating or controlling one or more different aspects of display 12. In some embodiments, display unit 12 may be connectable to communication channel bus 28, so to provide communication between display unit 12 and one or more additional devices on communication channel 28, such as a transmitter gauge 30, wireless transceiver 34, USB interface 36, and other modules 38, which may be for example an in-cabin display/controller, high power relays, printers, printer interfaces, refractometer modules, a global positioning system ("GPS") module, a temperature module, as well as others.

Display unit 12 may receive liquid level information from transmitter gauge 30 representing a measure level of a fluid housed within a tank in which transmitter gauge 30 has been installed. By using depth charts specific to such tank, a suitably configured processor (or processors) within display unit 12 may calculate a volume of the liquid within the tank for display on display unit 12. In the embodiment shown in FIG. 1, display unit 12 features two distinct graphical output devices, i.e., tank display 16 and batch display 18.

In some cases, tank display 16 may be used to display a volume of liquid remaining within the tank, as calculated by the fluid level information received from transmitted gauge 30, while batch display 18 may be used to display some other quantity, such as an amount of liquid that has been dispensed from the tank. Alternatively, tank and batch display 18 may each be used to display the volume of liquid remaining within two separate tanks, each such tank equipped with a corresponding transmitter gauge 30. Thus, multiple different transmitter gauges 30 are displayed in FIG. 1 connected to display unit 12 via communication channel 28. However, different numbers of transmitter gauges 30 (in general, one or more) may be included in system 10 in different embodiments. As explained further below, the liquid level information may be received at display unit 12 from a refractometer incorporated within or otherwise associated with a transmitter gauge 30.

In some embodiments, display unit 12 may be configured to receive power, such as between 8 and 30 Volts DC (VDC) at up to 500 mA of current, via a power connection 22 included in display unit 12. One or more inputs 24 and/or outputs 26, either analog and/or digital, may also be included in display unit 12. Such inputs 24 may be connected to different components or other circuitry, such as temperature sensors, optical outputs, relay outputs, etc.

In some embodiments, system 10 may comprise one or both of a wireless module 34 and a universal serial bus ("USB") module 36, as well as other modules 38, such as printers, high power relays, temperature sensors, pressure transducers, or refractometer modules. In other embodiments, display unit 12 may further comprise a built-in wireless transceiver module 14 configured for communication over a suitable wireless communication protocol, such as WiFi®, Bluetooth®, GPS or others. Wireless transceiver module 14 may be utilized, for example, for non-contact programming of display unit 12, such as by wireless uploading of software and/or firmware programs into persistent memory within display unit 12 using a handheld programmer 40, or with personal computer ("PC") 42. Alternatively, such programming may be effected over communication channel 28 using USB module 36 as shown in FIG. 1.

In some embodiments, a data connection between PC 42 and server 44, such as over the Internet or some other wide area communication protocol, may can be used to effect communication to one or both of display unit 12 and transmitters 30 for different purposes, such as troubleshooting, remote programming, software updates, etc.

In some embodiments, display unit 12 may include combinations of hardware and/or software and/or firmware components that are useful for processing fluid level information received from transmitter gauge 30 via communication channel 28. For example, the display unit 12 may include firmware that is operable to manage tables of data (or other suitable data structures) for maintaining transmitter gauge number(s), user input data, tank depth charts and alarm conditions. An analog to digital converter ("ADC") may be included in display unit 12. When a pulse is launched down transmitter gauge 30, the interaction of the pulse with an air/fluid interface in a tank may generally produce a reflected pulse propagating back up the transmitter gauge 30, in addition to a partially transmitted pulse through the liquid. Such partially transmitted pulse may further generate a second reflected pulse propagating back up the transmitter gauge 30 upon reaching a termination of transmitter gauge 30. As used herein throughout, terms such as "air" or "air/fluid interface" may refer to any suitable gas or vapor, as well as mixtures thereof, which is housed in the tank together with a fluid. For example, in some embodiments, nitrogen gas can be used as a vapour blanket in a tank in place of air.

In some embodiments, the ADC may be used in order to measure one or more different time parameters of returning pulses on the transmitter gauge 30. For example, returning reflected pulses may be expanded in time and the result sampled by ADC so as to determine time-of-flight on the transmitter gauge 30. Alternatively, if an ADC with a sufficiently fast sampling rate is utilized, then expansion of returning pulses in time may not be required. The ADC may be coupled to a processor and/or memory for storage or further data processing.

In some embodiments, display unit 12 may additionally, or alternatively, comprise firmware that implements a pulse width modulation ("PWM") module. In such cases, PWM module may be configured to generate a pulse having a width that is proportional to the time-of-flight of a returning pulse on transmitter gauge 30.

Figure 2A:
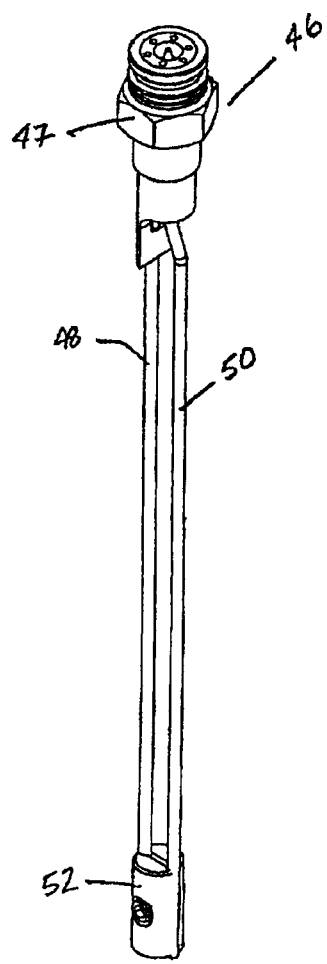
FIGS. 2A and 2B illustrate alternative embodiments of a fluid gauge according to the disclosure.
Figure 2B:
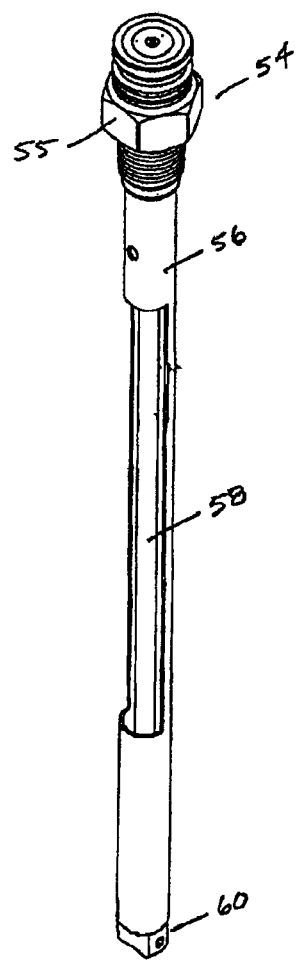

Referring now to FIGS. 2A and 2B, two example embodiments of a transmitter gauge are shown. Each transmitter gauge shown may be operative to generate electronic pulses that can be launched down the transmitter gauge toward a liquid housed in a tank in which the transmitter gauge may be installed, as well as to sense reflected pulses that have returned back up the transmitter gauge for processing to determine time-of-flight or other useful parameters. The example transmitter gauge 46 shown in FIG. 2A has a dual rod configuration, while the example transmitter gauge 54 shown in FIG. 2B has a coaxial configuration.

Referring now to FIG. 2A specifically, an example configuration of dual rod transmitter gauge 46 is illustrated. As shown, transmitter gauge 46 may comprise two rods, which may be substantially parallel to one another, extending downwardly from a transmitter coupler 47. Such parallel rods may comprise, for example, a signal rod 50 and a ground rod 48, each of which may terminate at a shorting block 52 located at a distal end of transmitter gauge 46 relative to transmitter coupler 47.

Referring now to FIG. 2B specifically, an example configuration of coaxial transmitter gauge 54 is illustrated. As shown, transmitter gauge 54 may comprise an internal signal rod 58 that is supported within, and axially co-located with, a cylindrical ground conductor 56. Similar to dual rod transmitter gauge 46, axial transmitter gauge 54 may include a transmitter coupler 55 and a shorting block 60 located distally from transmitter coupler 55. Both internal signal rod 58 and cylindrical grounder conductor 56 may extended between, e.g., downwardly, transmitter coupler 55 and shorting block 60.

Either transmitter gauge 46 or transmitter gauge 54 may be fixed at least partially within a fluid tank oriented such that the transmitter coupler 47,55 is above the shorting block 52,60, thereby extending downwardly into the fluid tank so as to be at least partially submerged within liquid housed within the tank. Terms such as "downward" or "downwardly", as used herein through, may (although not necessarily) be used in reference to relative directional and/or spatial orientations without requirement of any absolute directions or orientations.

Thus, in some embodiments, one or more transmitter gauges 30 may be fixed in place inside a tank or in an external stilling tube or well attached to, and in fluid communication with, the tank. Electronics inside transmitter gauge 30 may be configured to generate electronic pulses, for example, short radar pulses that are transmitted down the transmitter gauge 30 on either signal rod 50 or 58, as the case may be, depending on the configuration of transmitter gauge 30. For example, such electronic pulses may have a pulse width of approximately 500 picoseconds. When an electronic pulse encounters an air-liquid interface or a shorting block 52, 60, the impedance mismatch of the encountered discontinuity along the transmitter gauge 30 causes a portion of the electronic pulse energy to be reflected back up the transmitter gauge 30 for detection by a suitably configured sensor included in transmitter gauge 30 (another portion of the electronic pulse energy is transmitted beyond the discontinuity). As an alternative to radar pulses, radio frequency admittance, radio frequency capacitance and frequency modulated continuous wave may also be utilized in variant embodiments.

The time-of-flight of one or more pulses transmitted along the and reflected back up the transmitter gauge 30 may be used to calculate the level of the liquid in the tank. For example, in some embodiments, system 10 may further comprise a refractometer module configured to measure time-of-flight of electronic pulses along transmitter 30, which may be reflected from an air-liquid interface or a shorting block of transmitter 30, as well as other possible discontinuities along transmitter 30. Based on the measured times-of-flight and information relating to the geometry of the tank, the refractometer module (or some other component within system 10 that has processing capability) may estimate the level and/or volume of fluid housed in the tank.

Figure 3B:
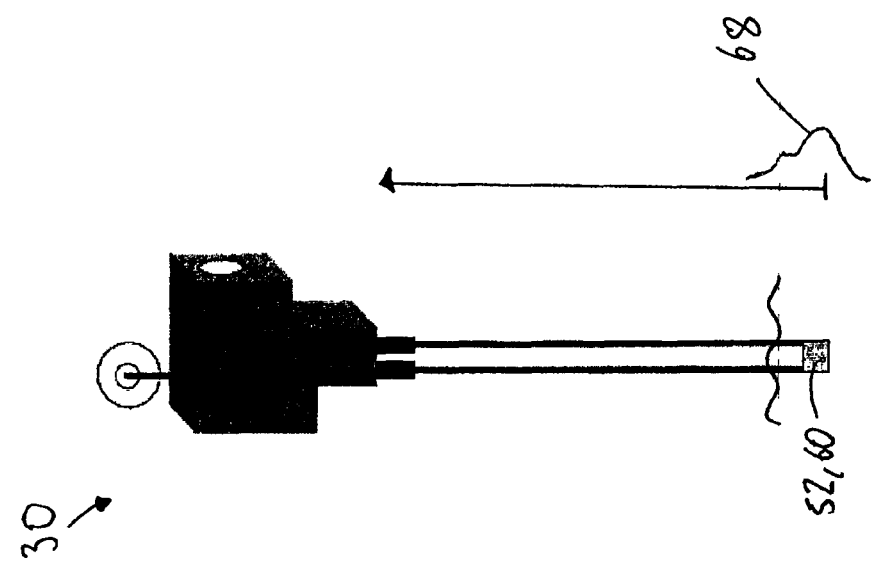
FIGS. 3A and 3B illustrate configurations of reflected electronic pulses on a fluid gauge.
Figure 3A:
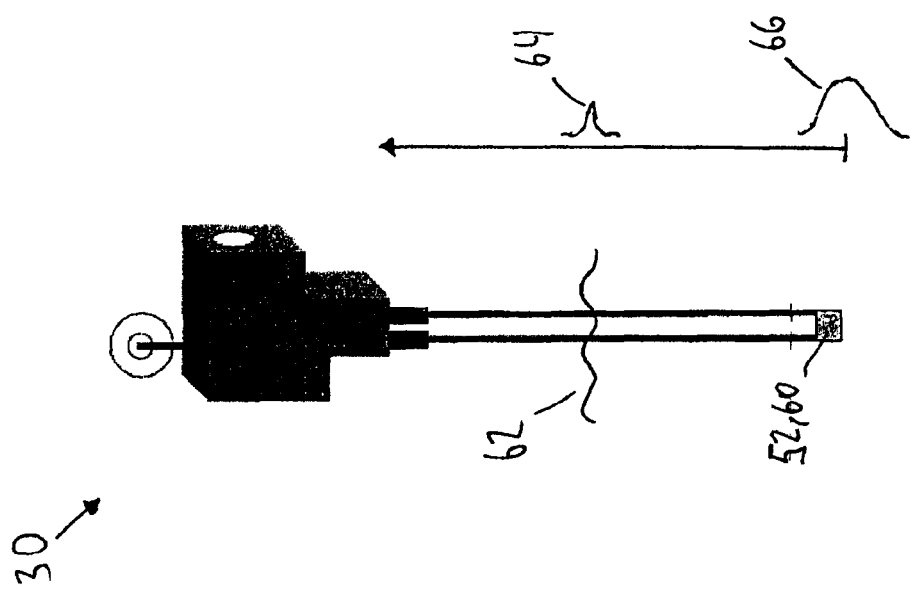

Referring now to FIGS. 3A and 3B, in some cases, the shape of the returning electronic pulses on the transmitter 30 may depend on the volume or level of liquid currently housed in the tank. For example, as shown in FIG. 3A, for an air-liquid interface 62 that is well above the shorting block 52,60 of transmitter gauge 30, two distinct electronic pulses may be generated, including an electronic pulse 64 generated by reflection at the air-liquid interface 62 and an electronic pulse 66 generated by reflection at the shorting block 52,60. At each encountered discontinuity, the amount of electronic pulse energy transmitted and reflected may depend on one or more different properties, such as dielectric constant, of the liquid housed within the tank. Thus, as seen in FIG. 3A, the reflected pulse 64 may generally exhibit a smaller amplitude and less dispersion than reflected pulse 66. Because the air-liquid interface 62 is sufficiently far away from the shorting block 52,60, the reflected pulses 64 and 66 are distinct, or substantially distinct, from one another and capable of separate detection.

However, in some cases, as seen in FIG. 3B, the air-liquid interface 62 may be close enough to the shorting block 52,60 that reflections due to the air-liquid interface 62 and shorting block 52,60 are mingled together and not separately detectable. In such cases, which for low liquid levels in the tank, only a single reflected pulse 68 may be generated due to reflections. Such occurrence may be especially observed for liquids having a low dielectric constant, e.g., close to that of air, which therefore produce generally small reflections at air-liquid interface 62 in relation to the amount of electronic pulse energy transmitted through toward shorting block 52,60. Thus, when the air-liquid interface 62 is close to shorting block 62,60, the relatively small reflection at the air-liquid interface 62 may tend to be comingled with the relatively large and dispersive reflection at the shorting block 52,60.

According to the described embodiments, there are provided methods for estimating the level or volume of fluid in a tank that are based on measured time-of-flight of electronic pulses in one of the plurality of different operating modes depending on the level of liquid in the tank. For example, in a first mode of operation corresponding to a first range of fluid levels at which an air-interface and shorting block of a fluid gauge transmitter generate distinct reflections, fluid or volume level may be estimated based on a time-of flight of a first reflected pulse from the air-fluid interface. However, in a second mode of operation corresponding to a second range of fluid levels at which an air-interface and shorting block of a fluid gauge transmitter do not generate distinct reflections, fluid or volume level may be estimated based on a time-of flight of a second reflected pulse from the shorting block. In such methods, the level of fluid in the tank at which reflections between indiscernible may be known in advance or otherwise ascertained, and the appropriate mode of operation selected based on such level. These various modes of operations will be described below.

Referring now to FIG. 4, there is shown a method 400 of determining fluid level in a tank according to the disclosure. Method 400 may be performed using a transmitter gauge, such as transmitter gauge 30, in some cases in conjunction with additional electronic components or circuitry. While illustrated in FIG. 4 as a series of actions for convenience, method 400 may be modified in one or more ways without departing from the scope of the disclosure. For example, additional actions not explicitly shown in FIG. 4 may be performed, while those actions shown may be varied.

In 405, one or more electronic pulses are generated, e.g., by a transmitter gauge 30 and transmitted down a probe or electrode of such transmitter gauge. As described herein, the electronic pulses may be guided wave radar (GWR) pulses, or some alternative thereto, which are partially reflected back up the transmitter gauge upon encountering discontinuities, such as an air-liquid interface or shorting block.

In 410, a returning electronic pulse caused by reflection at an air-liquid interface is detected. As described herein, method 400 may be suitable for use in determining fluid and/or volume level of a liquid housed in a tank when the level of such liquid is relatively high, such that reflected electronic pulses from each of an air-liquid interface and a terminal end, e.g., a shorting block, of a transmitter gauge are sufficiently distinct from each other. Thus, arrival of the returning pulse due to reflection at the air-liquid interface is detectable in 410 independently from a returning pulse due to reflection at the shorting block, which may also be detected.

In 415, liquid level within the tank is determined based on the measured time-of-flight of the reflected electronic pulse from the air-liquid interface. Provided the speed of the electronic pulse(s) on the transmitter gauge in air are known beforehand or are otherwise ascertainable, the distance traveled by the reflected electronic pulse may be estimated from the measured time-of-flight according to:

$$TOF = 2\frac{h_{liquid}}{v_{air}}, \quad (1)$$

where $h_{liquid}$ represents the height of the air-liquid interface within the tank, e.g., determined as a distance from a suitable reference point at the top of the transmitter gauge, $v_{air}$ represents the speed of the electronic pulse(s) in air, and TOF represents the measured time-of-flight of the returning pulse.

Referring now to FIG. 5, there is shown a method 500 of determining fluid level in a tank according to the disclosure. Method 500 may be performed using a transmitter gauge, such as transmitter gauge 30, in some cases in conjunction with additional electronic components or circuitry. While illustrated in FIG. 5 as a series of actions for convenience, method 500 may be modified in one or more ways without departing from the scope of the disclosure. For example, additional actions not explicitly shown in FIG. 5 may be performed, while those actions shown may be varied.

In 505, one or more electronic pulses are generated, e.g., by a transmitter gauge 30 and transmitted down a probe or electrode of such transmitter gauge. As described herein, the electronic pulses may be guided wave radar (GWR) pulses, or some alternative thereto, which are partially reflected back up the transmitter gauge upon encountering discontinuities, such as an air-liquid interface or shorting block.

In 510, a returning electronic pulse caused by reflection at a terminal end, such as a shorting block, of a transmitter gauge is detected. As described herein, method 500 may be suitable for use in determining fluid and/or volume level of a liquid housed in a tank when the level of such liquid is relatively low, such that reflected electronic pulses from the an air-liquid interface and terminal end of a transmitter gauge are comingled and therefore, effectively, indistinct from each other. In some cases, the contribution to the comingled pulse due to reflection at the shorting block may dominate in magnitude to the contribution due to reflection at the air-liquid interface. Thus, the arrival time of the single, comingled reflection at the top of the transmitter gauge may be taken as a reasonable estimate of the time-of-flight of the reflected pulse from the shorting block (as opposed to the reflection from the air-liquid interface).

In 515, liquid level within the tank is determined based on the measured time-of-flight of the reflected electronic pulse from the shorting block. Provided the speed of the electronic pulse(s) on the transmitter gauge in both air and the specific liquid being housed in the tank are known beforehand or are otherwise ascertainable, the distance traveled by the reflected electronic pulse may be estimated from the measured time-of-flight according to:

$$TOF = 2\left(\frac{h_{liquid}}{v_{air}} + \frac{L_{gauge} - h_{liquid}}{v_{liquid}}\right), \quad (2)$$

where $h_{liquid}$ represents the height of the air-liquid interface within the tank, e.g., determined as a distance from a suitable reference point at the top of the transmitter gauge, $L_{gauge}$ represents the known length of the transmitter gauge defined between such reference point and the shorting block, $v_{air}$ represents the speed of the electronic pulse(s) in air, $v_{liquid}$ represents the speed of the electronic pulse(s) in the housed liquid, and TOF represents the measured time-of-flight of the returning pulse.

In equation (2) above, liquid level within the tank may be determined by measuring time-of-flight from a returning pulse reflected from the shorting block (as opposed to the air-liquid interface) because the speed response of such electronic pulses in different liquid media is predictable. For example, such speed generally decreases relative to speed in air when a liquid is encountered, and the amount of the decrease is related to the dielectric constant of the liquid. By knowing the speed response of the electronic pulse, different times-of-flight of returning electronic pulse(s) may be correlated to the distance through which an electronic pulse traveled in liquid. Thus, by knowing the length of the transmitter gauge, the measured time-of-flight may also be correlated to an estimate of the height of the liquid within the tank.

In some embodiments, the estimations of liquid level using time-of-flight of an electronic pulse reflected from an air-liquid interface (e.g., method 400) may tend to provide more accuracy than estimations using time-of-flight of electronic pulses reflected from a shorting block of a transmitter gauge (e.g., method 500). For example, as seen in FIGS. 3A and 3B, pulse dispersion in a reflection 64 from the air-liquid interface is generally less than in a reflection 66,68 from the shorting block. Thus, more accurate time-of-flight information may be obtainable by sensing pulse 64, which leads to greater accuracy overall of liquid level estimation.

However, as described herein, it may not be possible to detect usable reflections 64 from the air-liquid interface 62 when the liquid level in the tank is sufficiently low that reflections 64 and 66 are superimposed into a single composite reflection 68. Thus, while it may generally be preferable to estimate liquid level, if possible, based on reflections 64 from the air-liquid interface 66 on account of the greater accuracy achievable, it may still be possible in such cases to generate less accurate determinations of liquid level based on reflections 68 from a shorting block. However, as will be appreciated, it would still also be possible to estimate liquid level based on reflections 66 from a shorting block, even in cases where reflections 64 are separately detectable.

Figure 6:
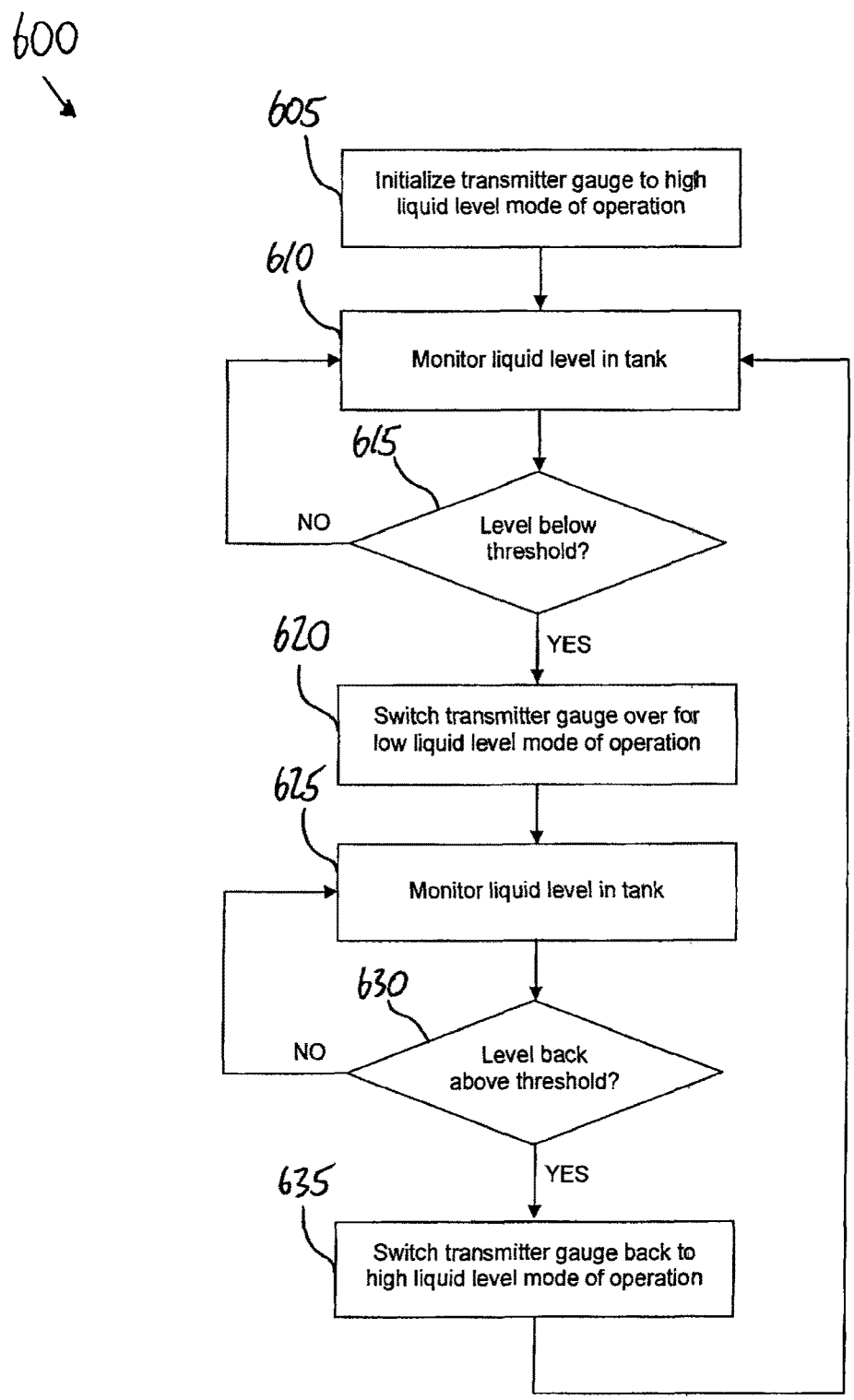
FIG. 6 illustrates a method of operating a fluid gauge in a dual mode for determination of both high and low fluid levels according to the disclosure.

Referring now to FIG. 6, there is illustrated a method 600 of estimating liquid level in a tank using a transmitter gauge and/or transmitter gauge system that is capable of operation in a dual mode based on the liquid level in relation to a threshold value. As described herein, preference may be shown for liquid level estimation by detecting pulse reflections from an air-liquid interface, as opposed to a shorting block of a transmitter gauge so as to generate relatively high accuracy estimations if possible.

Thus, in 610, a transmitter gauge or associated electronic components or circuitry and/or processors are initialized for a high liquid level mode of operation. For example, such initialization may be performed at the time a tank is filled with a particular fluid or, alternatively, any time thereafter. As described herein, because fluid level may be more accurately measured when fluid levels are high, e.g., above a minimum threshold level, preference may be given to operation in the high fluid level mode of operation. However, as described further below, fluid level may be monitored and operation of the transmitter gauge may be switched between high and low fluid level modes accordingly. Thus, in some cases, initialization to a high fluid level mode of operation may not be required or performed, in which case 610 may be omitted.

In 610, liquid level in the tank may be monitored according to the high fluid level mode of operation. For example, as described herein, in such mode of operation, fluid level may be determined based on a measured time-of-flight of returning pulses reflected from an air-liquid interface. Such fluid level determinations may be performed repeatedly, such as on regular (or irregular) intervals, as well as on request, so that liquid level in the tank may be tracked over time. In this regard, method 400 (shown in FIG. 4) may be utilized to estimate fluid levels.

In some embodiments, fluid level information generated by transmitter gauge 30 may be transmitted to display unit 22 over communication channel (shown in FIG. 1) for computation of fluid volume information that may then be displayed on the display unit 22. Alternatively, fluid volume information may be calculated internally to the transmitter gauge 30 and then transmitted over communication channel 28 for display on display unit 22.

In some embodiments, so long as the monitored fluid level remains at a relatively high level, which may be defined in terms of a minimum threshold level, transmitter gauge may be operated in the high fluid level mode of operation. Thus, in 615, the monitored fluid level may be compared to the minimum threshold level, which may be defined as a cut-off point between relatively "high" and "low" fluid levels, as these terms are used herein throughout. If the fluid level of the tank has not fallen below the minimum threshold level (indicating that fluid levels remain relatively high), then method 615 branches back to 610 wherein fluid level continues to be monitored according to the high fluid level mode of operation. However, if it is determined that fluid level in the tank has fallen below the minimum threshold level, then method 600 branches to 620 wherein operation of the transmitter gauge switches over to the generally less accurate, low fluid level mode of operation, described further below.

Different approaches to determining in 615 whether fluid level has fallen below the minimum threshold level are possible. For example, as described herein, such minimum threshold level may be related to the time separation between returning pulses from the air-liquid interface and terminal end (e.g., shorting block) of the transmitter gauge, respectively. More specifically, the minimum threshold level is at or near to the point wherein such pulses become indistinguishable and not separately detectable.

In some embodiments, the minimum threshold level may be determined ahead of time through, e.g., offline testing of a transmitter gauge in order to determine a level (or approximate range of levels) at which pulses are no longer separately detectable. Alternatively, to provide some buffer, the minimum threshold level may be determined as the level at which the time separation between pulses returning from the air-liquid interface and the shorting block drops below a minimum detectable time in the refractometer module. In some cases, the minimum threshold level may be determined experimentally by detecting known levels of fluid using the high level mode of operation and observing the point at which the generated estimates begin to deviate from the known actual values.

However the minimum threshold level is determined, it may be stored or programmed into the transmitter gauge for comparison against monitored levels, i.e., in 615, so that when the fluid level in the tank does drop below the defined minimum threshold level, the transmitter gauge may be switched over in 620 to operation in the low fluid level mode of operation. For example, such switch over may involve transmitter gauge loading a different runtime program, or executing different control instructions stored in associated memory within the transmitter gauge, which are associated with the low fluid level mode of operation.

In 625, liquid level in the tank may be monitored according to the low fluid level mode of operation. For example, as described herein, in such mode of operation, fluid level may be determined based on a measured time-of-flight of returning pulses reflected from a shorting block of the transmitter gauge, together with a known length of the transmitter gauge. Similar to 610, such fluid level determinations in 625 may be performed repeatedly, such as on regular (or irregular) intervals, as well as on request, so that liquid level in the tank may be tracked over time. In this regard, method 500 (shown in FIG. 5) may be utilized to estimate fluid levels.

Additionally, in some embodiments, fluid level information generated by transmitter gauge 30 in 625 may be transmitted to display unit 22 over communication channel for computation of fluid volume information that may then be displayed on the display unit 22. In other cases, fluid volume information may be calculated internally to the transmitter gauge 30 and then transmitted over communication channel 28 for display on display unit 22.

In some embodiments, so long as the monitored fluid level remains at a relatively low level, i.e., below the defined minimum threshold level, transmitter gauge may continue to be operated in the low fluid level mode of operation. Thus, in 630, the monitored fluid level may be compared again to the minimum threshold level. If the fluid level of the tank has not risen back above the minimum threshold level (indicating that fluid levels remain relatively low), then method 600 branches back to 625 wherein fluid level continues to be monitored according to the low fluid level mode of operation. For example, fluid level may rise back above the minimum threshold level if additional fluid is added to the tank or if the fluid level had been improperly measured, which could occur if the fluid is not settled at the time a measurement is taken, or for any other reason.

However, if it is determined that fluid level in the tank has risen back above the minimum threshold level, then method 600 branches to 635 wherein operation of the transmitter gauge switches back to the generally more accurate, high fluid level mode of operation. As above, switching to the high fluid level mode of operation may involve the transmitter gauge loading a different runtime program, or executing different control instructions stored in associated memory within the transmitter gauge, which are associated with the high fluid level mode of operation. Following switching to the high fluid level mode of operation in 635, method 600 may branch back to 610 wherein fluid level is monitored using the more accurate estimation based on time-of-flight of returning pulses from the air-liquid interface.

While method 600 has been presented, for convenience and clarity, with a particular organization in which different actions occurs in an illustrated sequence, it will be appreciated that modifications and variations may be possible. For example, certain control or process flows in method 600 may be substituted for their functional equivalents. In other cases, different actions may be performed in a different sequence or not at all.

The above description has been provided with reference to certain example embodiments and is meant to be exemplary only. As such, one skilled in the art may recognize that changes may be made to the embodiments described without departing from the scope of the invention disclosed. All such modifications and variations that will be apparent to those skilled in the art, in light of a review of this disclosure, are intended to be encompassed within the invention, which is limited only by the appended claims.

What is claimed is:

1. A system for measuring fluid level in a tank, comprising:
   a transmitter gauge installed on or in the tank, the transmitter gauge comprising a probe arranged to be at least partially immersed in the fluid and adapted to conduct energy pulses generated by an energy source within the transmitter gauge; and
   a refractometer module operatively coupled to the transmitter gauge, the refractometer module comprising a processor configured to measure travel times of the energy pulses conducted along the probe and to determine the fluid level in the tank based on the measured travel times:
   if the fluid level in the tank is below a threshold level, according to a first mode of operation, by determining the fluid level in the tank based on the measured travel time of an energy pulse reflected from a terminal end of the probe, a length of the probe, a speed of the reflected energy pulse in air, and a speed of the reflected energy pulse in the liquid; and
   if the fluid level in the tank is above the threshold level, according to a second mode of operation, by determining the fluid level in the tank based on the measured travel time of an energy pulse reflected from an air-liquid interface defined between the air and the liquid in the tank, and a speed of the reflected energy pulse in the air.

2. The system of claim 1, wherein the processor of the refractometer module is configured to operate initially according to the second mode of operation.

3. The system of claim 2, wherein the processor of the refractometer is configured when in the second mode of operation to:
   monitor the fluid level in the tank;
   compare the monitored fluid level in the tank with the threshold level; and
   if it is determined that the fluid level in the tank has dropped below the threshold level, switch over to the first mode of operation.

4. The system of claim 3, wherein the processor of the refractometer module is configured when in the first mode of operation to:
   monitor the fluid level in the tank;
   compare the monitored fluid level in the tank with the threshold level; and
   if it is determined that the fluid level in the tank has risen above the threshold level, switch over to the second mode of operation.

5. The system of claim 1, wherein the processor of the refractometer module is configured to determine the threshold level based on a minimum time separation between the measured times-of-flight of the reflected energy pulse from the air-liquid interface and the reflected energy pulse from the terminal end of the probe.

6. The system of claim 1, further comprising:
   a display unit communicatively linked to at least one of the transmitter gauge and the refractometer module by a communication network, the display unit configured to:
   1. receive fluid level information from the transmitter gauge or the refractometer module representing the determined fluid level in the tank;
   2. calculate a volume of fluid housed in the tank based on the received fluid level information; and
   3. display the calculated volume of fluid housed in the tank.

7. A method of measuring fluid level in a tank, comprising:
   conducting energy pulses along a probe of a transmitter gauge arranged to be at least partially immersed in the fluid;
   measuring travel times of the energy pulses conducted along the probe; and
   determining the fluid level in the tank based on the measured travel times:
   if the fluid level in the tank is below a threshold level, according to a first mode of operation, by determining the fluid level in the tank based on the measured travel time of an energy pulse reflected from a terminal end of the probe, a length of the probe, a speed of the reflected energy pulse in air, and a speed of the reflected energy pulse in the liquid; and
   if the fluid level in the tank is above the threshold level, according to a second mode of operation, by determining the fluid level in the tank based on the measured travel time of an energy pulse reflected from an air-liquid interface defined between the air and the liquid in the tank, and a speed of the reflected energy pulse in the air.

8. The method of claim 7, further comprising determining the fluid level in the tank initially according to the second mode of operation.

9. The method of claim 8, further comprising, when in the second mode of operation:
   monitoring the fluid level in the tank;
   comparing the monitored fluid level in the tank with the threshold level; and
   if it is determined that the fluid level in the tank has dropped below the threshold level, switching over to the first mode of operation.

10. The method of claim 9, further comprising, when in the first mode of operation:
monitoring the fluid level in the tank;
comparing the monitored fluid level in the tank with the threshold level; and
if it is determined that the fluid level in the tank has risen above the threshold level, switch over to the second mode of operation.

11. The method of claim 7, further comprising determining the threshold level based on a minimum time separation between the measured times-of-flight of the reflected energy pulse from the air-liquid interface and the reflected energy pulse from the terminal end of the probe.

12. The method of claim 7, further comprising:
transmitting fluid level information representing the determined fluid level of the tank to a display unit;
at the display unit, calculating a volume of fluid housed in the tank based on the transmitted fluid level information; and
displaying the calculated volume information on the display unit.

13. A computer readable medium persistently storing instructions that, when executed, program a processor to perform a method of measuring fluid level in a tank, the instructions comprising:
conducting energy pulses along a probe of a transmitter gauge arranged to be at least partially immersed in the fluid;
measuring travel times of the energy pulses conducted along the probe; and
determining the fluid level in the tank based on the measured travel times:
if the fluid level in the tank is below a threshold level, according to a first mode of operation, by determining the fluid level in the tank based on the measured travel time of an energy pulse reflected from a terminal end of the probe, a length of the probe, a speed of the reflected energy pulse in air, and a speed of the reflected energy pulse in the liquid; and
if the fluid level in the tank is above the threshold level, according to a second mode of operation, by determining the fluid level in the tank based on the measured travel time of an energy pulse reflected from an air-liquid interface defined between the air and the liquid in the tank, and a speed of the reflected energy pulse in the air.

14. The computer readable medium of claim 13, wherein the instructions further comprise determining the fluid level in the tank initially according to the second mode of operation.

15. The computer readable medium of claim 14, wherein the instructions further comprise, when in the second mode of operation:
monitoring the fluid level in the tank;
comparing the monitored fluid level in the tank with the threshold level; and
if it is determined that the fluid level in the tank has dropped below the threshold level, switching over to the first mode of operation.

16. The computer readable medium of claim 15, wherein the instructions further comprise, when in the first mode of operation:
monitoring the fluid level in the tank;
comparing the monitored fluid level in the tank with the threshold level; and
if it is determined that the fluid level in the tank has risen above the threshold level, switch over to the second mode of operation.

17. The computer readable medium of claim 13, wherein the instructions further comprise determining the threshold level based on a minimum time separation between the measured times-of-flight of the reflected energy pulse from the air-liquid interface and the reflected energy pulse from the terminal end of the probe.

18. The computer readable medium of claim 13, wherein the instructions further comprise:
transmitting fluid level information representing the determined fluid level of the tank to a display unit;
at the display unit, calculating a volume of fluid housed in the tank based on the transmitted fluid level information; and
displaying the calculated volume information on the display unit.

* * * * *